United States Patent [19]
Burton et al.

[11] Patent Number: 5,114,445
[45] Date of Patent: May 19, 1992

[54] FLARE VENT HEAD

[75] Inventors: Anthony R. Burton; Dallas D. Douglas, both of Andrews, Tex.

[73] Assignee: Atlantic Richfield Company, Los Angeles, Calif.

[21] Appl. No.: 716,871

[22] Filed: Jun. 18, 1991

[51] Int. Cl.⁵ .............................................. B01D 50/00
[52] U.S. Cl. ..................................... 55/320; 55/463; 55/465; 55/505
[58] Field of Search ........ 255/320, 423, 426, 462–465, 255/505, 507

[56] References Cited
U.S. PATENT DOCUMENTS 1,230,784  6/1917  Rice ................................. 55/462
1,405,259  1/1922  Beach ............................... 55/464
4,565,554  1/1986  Zipay et al. ...................... 55/464

Primary Examiner—Bernard Nozick
Attorney, Agent, or Firm—Roderick W. MacDonald

[57] ABSTRACT

A flare vent head adapted for use on a vent riser for venting gas-liquid mixtures wherein an adapter means for fixing said head to the vent riser carries a plurality of baffle means surmounted by a diversion member, all of which enclosed in a wall closure so that gas and liquid are separated by action of the diversion member and baffle means within the wall closure thereby allowing liquid to pass downwardly from the vent head and gas separated from the liquid to pass upwardly through the top of the vent head.

7 Claims, 2 Drawing Sheets 5,114,445

FLARE VENT HEAD

BACKGROUND OF THE INVENTION

Heretofore pipelines, accumulator tanks, surge vessels and other equipment which store, transport, or otherwise handle gas-liquid mixtures such as hydrocarbons, water, and the like which contain one or more of natural gas, carbon dioxide, and the like, have had associated therewith a vent means. Such vent means are used, due to a temporary overload or safety situation or other circumstance, to discharge small amounts of the mixture being handled in that equipment to the atmosphere outside that equipment. This venting is done when the equipment is shut down or overloaded with the gas-liquid mixture to prevent damaging the equipment and creating leaks or worse which would create discharges much greater than the limited, controlled and temporary venting by way of a vent means designed for such a purpose. The vent means are normally a small diameter pipeline connected to the equipment to be vented. Such a pipeline extends for a distance away from the equipment and then terminates in a generally upstanding or otherwise vertical pipe known as a "vent riser". The upper end of the vent riser terminates a substantial distance in the air so that the gas from the gas-liquid mixture, if flammable, can be ignited and burned as a flare to dispose of the gas, the liquid portion falling to the earth's surface for collection and disposal.

It is undesirable to eject the gas-liquid mixture from the vent riser vertically into the atmosphere because this can allow for wider dispersion of the liquid portion. Accordingly, various flare vent heads have been employed at the upper end of vent risers to direct the flow of gas and liquid downwardly. This helps contain the dispersion of liquid, but when a flammable gas is ignited, the flame can and has in various circumstances grown large enough and hot enough that it has done damage to the vent riser itself and even supporting members for the vent riser that extend from the earth's surface part way up the vent riser.

SUMMARY OF THE INVENTION

In accordance with this invention there is provided a flare vent head which separates gas from liquid as the vented mixture leaves the vent riser, directs the liquid downwardly for localized collection at the earth's surface, and allows most, if not all, of the gas to exit upwardly. This way, when the vented gas is ignited, the flame will be directed essentially upwardly rather than downwardly around the vent riser itself, but will not carry any substantial amount of liquid upwardly therewith.

Accordingly an object of this invention is to provide a new and improved flare vent head. It is another object to provide a new and improved apparatus for separating gas from liquid in vented mixtures. It is another object to provide a new and improved flare vent head which will allow combustion of gas vented therethrough in a manner such that with even large amounts of burning gas the vent riser and its supporting members are not put at risk by the resulting vent flame. Other aspects, objects and advantages of this invention will be apparent to those skilled in the art from this disclosure and the appended claims.

DETAILED DESCRIPTION OF THE INVENTION

Figure 1:
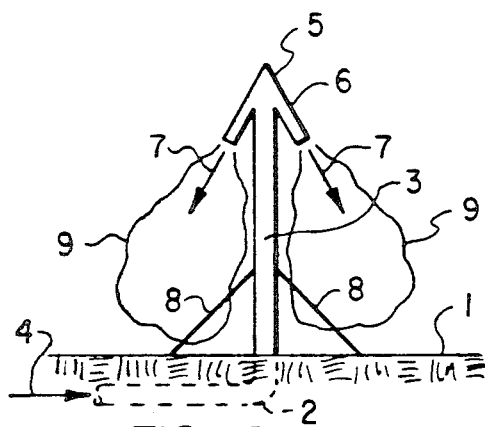
FIG. 1 shows one prior art embodiment of a vent riser and flare vent head.

FIG. 1 shows the earth's surface 1 with a pipeline 2 therein which connects, at some distance, to equipment (not shown) which contains a mixture of gas and liquid. Pipeline 2 is connected to an upstanding or otherwise vertical vent riser 3 so that fluid being temporarily vented from the equipment into pipeline 2 will pass as shown by arrow 4 through pipeline 2 into vent riser 3 and therein rise upwardly to the top thereof which is capped by a flare vent head 5. Head 5 has downwardly extending pipes 6 which direct gas-liquid mixture 4 downwardly as shown by arrows 7. Vent riser 3 is supported by angled members 8. Head 5 directs liquid downwardly for localized accumulation for disposal, but when the gas associated with the liquid is ignited for flaring purposes a large combustion zone 9 can be formed and can impinge not only on vent riser 3 but also support members 8. With exposure to flames 9 for a long enough period and/or high enough temperature vent riser 3 and/or support members 8 can be damaged even to the extent of rendering the flare vent unusable.

Figure 2:
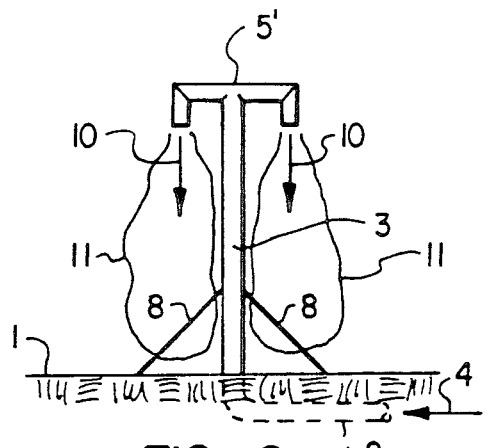
FIG. 2 shows another prior art embodiment of a vent riser and flare vent head.

FIG. 2 shows another prior art flare vent device wherein riser 3 is capped with a vent head 5' that is essentially an inverted "U" shape and that directs the vented gas-liquid mixture directly downwardly as shown by arrows 10. This way the resulting flame 11 from combustion of the gas in the gas-liquid mixture, if the gas is flammable, will also impinge upon and potentially damage vent riser 3 and/or support members 8.

Figure 3:
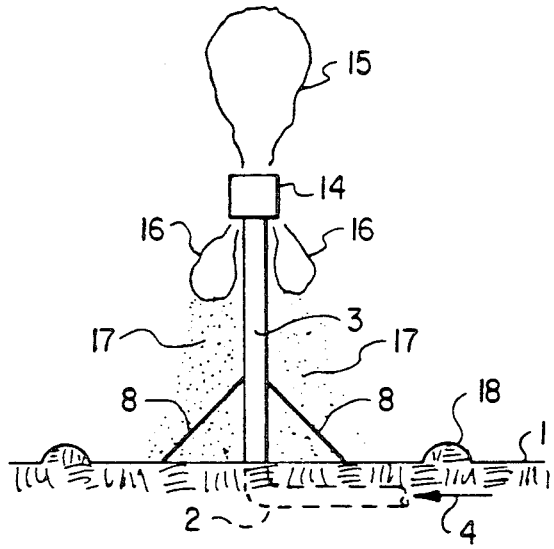
FIG. 3 shows a vent riser similar to that of the prior art but carrying a flare vent head of the instant invention.

FIG. 3 shows the vent riser 3 of FIGS. 1 and 2 but capped by a vent head 14 constructed in accordance with this invention. In operation, flare vent head 14 will direct most, if not all, of the gas leaving riser 3 vertically upward so that a flame 15 will extend upwardly and away from head 14 as well as riser 3 and support members 8. If a very large amount of gas is vented some gas could be emitted from the lower end of head 14 in which case smaller flames 16 will be directed downwardly but they will be small enough that no substantial damage to riser 3 or support members 8 will be experienced. Head 14 separates liquid from gas internally thereof so that flame 15 does not contain any substantial amount of liquid particles, essentially all of the liquid in the vented gas-liquid mixture inside head 14 being directed downwardly through the open bottom end of head 14 as shown at 17 for collection at the earth's surface 1 within a surrounding dam or earth berm 18.

Figure 4:
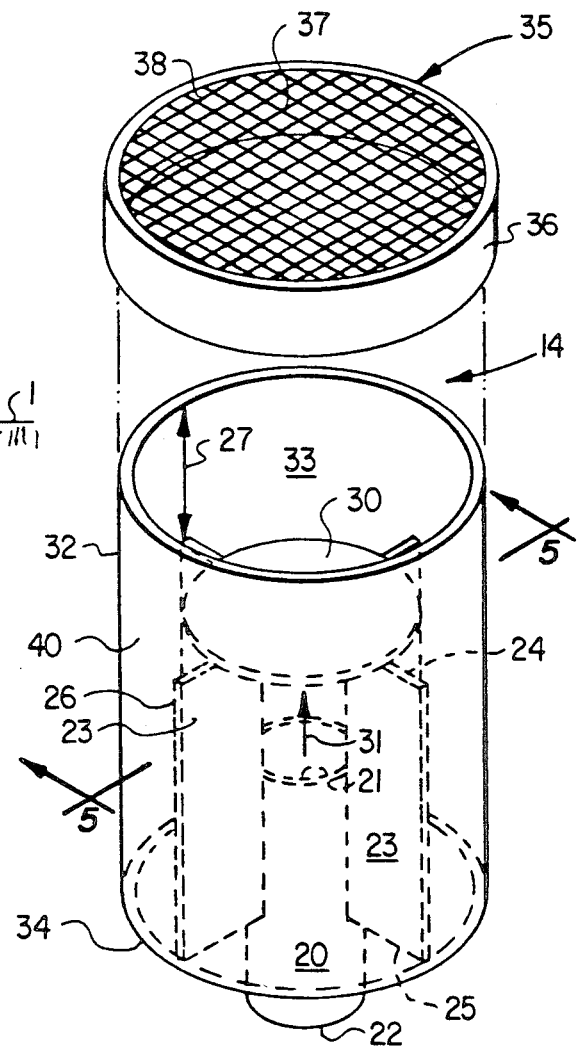
FIG. 4 shows an isometric view of the flare vent head of FIG. 3.

FIG. 4 shows flare vent head 14 to be composed of a central adapter means 20 which is hollow and has an open top end 21 and open bottom end 22. Bottom end 22 fits on the upper open end of riser 3 by any convenient method such as threaded connections, pin connections, welding, or the like. It is preferable that adapter 20 be removably fixed to riser 3 for ease of replacement, maintenance, and the like. Thus, gas-liquid mixtures vented through riser 3 pass through the hollow interior of adapter means 20 and exit through open end 21 in an essentially upward or vertical direction.

A plurality of upstanding spaced-apart baffle means 23 are carried by adapter 20 in spaced-apart relation around the periphery of adapter 20, each baffle means 23 having an upper end 24 and lower end 25 and extending laterally away from adapter means 20 to end in an outer, upstanding edge 26. Each baffle means 23 has its lower end 25 near (above or below), but not necessarily at, bottom end 22 of adapter 20. A finite length of adapter 20 preferably extends below lower end 25 of baffles 23 to provide room for applying tools to adapter 20 for fixing adapter 22 to vent riser 3. Baffle means 23 extends upwardly beyond open end 21 of adapter 20 a finite distance, upper ends 24 of baffle means 23 all or essentially all terminating at a common level or plane above open end 21 as shown better in FIG. 5. A solid diversion member 30 is carried by upper ends 24 of baffles 23 directly over open end 21 so that gas-liquid mixture that exists vertically from open end 21 impinges on the lower side of diversion member 30 as shown by arrow 31.

As shown hereinafter in relation to FIG. 8, the gas-liquid mixture is redirected at least in part by diversion member 30 laterally away from the longitudinal axis of adapter 20. Baffle means 23 help to redirect such gas-liquid mixture into a lateral direction of movement away from adapter 20 thereby removing the mixture from the vicinity above open end 20 and below diversion member 30.

A wall closure means 32 encompasses baffle means 23 and is fixed to outer edges 26, wall closure means 32 having an open top 33 and an open bottom 34. Wall closure 32 extends from near the lower end of adapter 20, preferably from lower edges 25 of baffles 23, to a height substantially above diversion member 30 so that space 27 is provided between the top side of diversion member 30 and open end 33 of wall closure 32.

A mist extractor cap 35 is carried over open top 33, cap 35 having a downwardly extending flange member 36 which fits around and outside closure wall 32 and a perforate top closure means 37 which has sufficient spaced-apart openings therein so as to allow most, if not all, gas passing from open end 21 of adapter 20 to pass therethrough, but with sufficient spaced-apart solid members 38 to knock a substantial amount, if not all, of any liquid that is still contained in the gas from that gas before it leaves cap 35. The liquid particles that are removed by cap 35 are directed downwardly by force of gravity toward open bottom 34 of wall closure means 32. Perforate closure means 37 can be any device such as screen, mesh, or a plurality of layers of mesh, or the like which provides a perforate member having a plurality of spaced-apart solid members for liquid knockdown.

Figure 5:
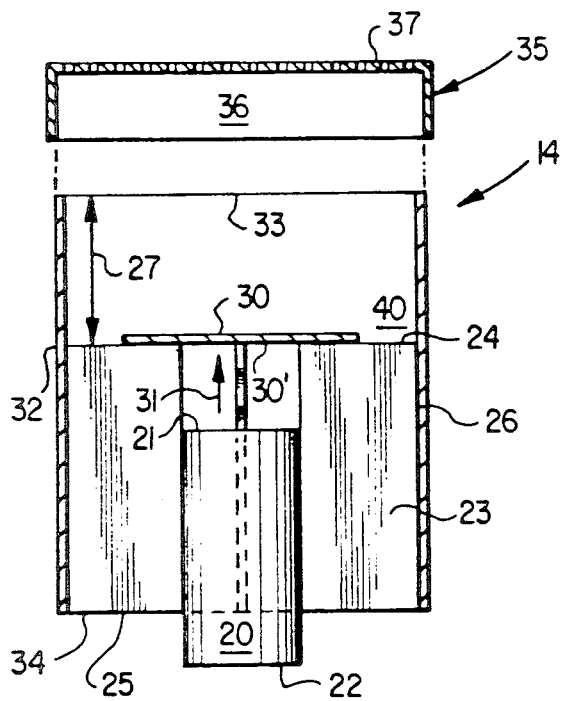
FIG. 5 shows a cross-sectional side view of the flare vent head of FIG. 4.

FIG. 5 is a side view of vent head 14 of FIG. 4 and shows that gas-liquid mixture 31 exiting vertically from the upper open end 21 of adapter 20 will impinge upon the bottom side 30' of diversion member 30 and then, with the aid of baffle means 24, will be directed laterally towards wall closure 32. FIG. 5 also shows that upper edges 24 of baffle means 23 all terminate at a common level to support diversion member 30 in a manner so that it is spaced substantially above open end 21.

Figure 6:
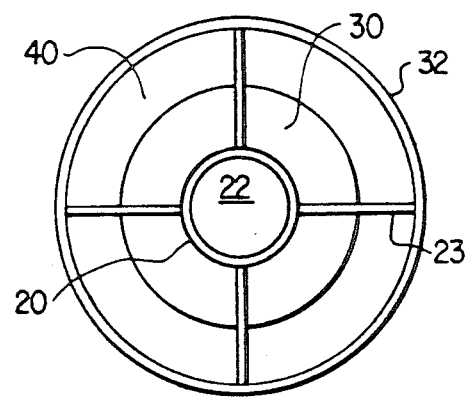
FIG. 6 shows a bottom view of the flare vent head of FIG. 4.

FIG. 6 shows a bottom view of the apparatus of FIGS. 4 and 5 and further shows that a gas-liquid mixture entering the open bottom end 22 of adapter 20 sees only diversion member 30 above it as it passes through adapter 20 and exits upwardly through upper open end 21.

Figure 7:
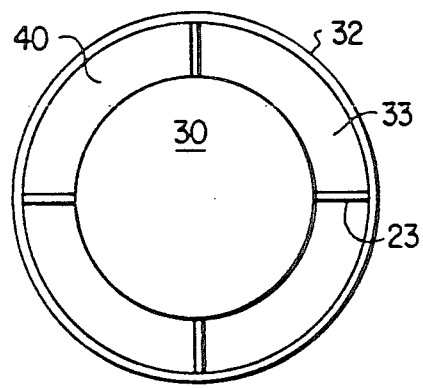
FIG. 7 shows a top view of the flare vent head of FIG. 4.

FIG. 7 is a top view of the apparatus of FIGS. 4 and 5 with cap 35 removed to expose the upper side of diversion member 30 and baffles 23 extending beyond the outer edge of diversion member 30, such baffles extending out to contact with wall closure 32 thereby leaving annular space 40 for up-rising gas to pass between wall closure 32 and the outer edge of diversion member 30 to reach open end 33 for passage through cap 35 and venting to the atmosphere for combustion, or the like.

Figure 8:
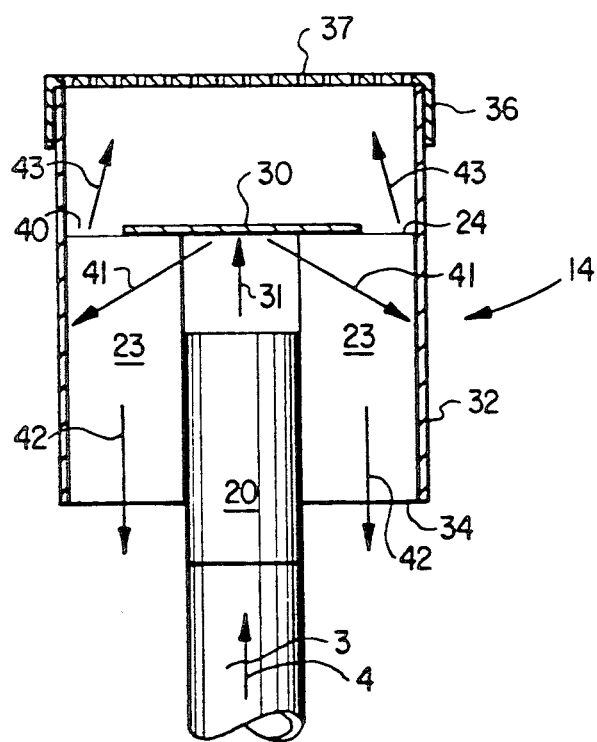
FIG. 8 shows a cross-sectional view of the vent riser and flare vent head of FIG. 3 in operation.

FIG. 8 shows vent head 14 wherein gas-liquid mixture 4 from pipeline 2 of FIG. 3 is rising upwardly in vent riser 3 toward adapter 20 and exiting from the upper open end of adapter 20 as shown by arrow 31 to impinge upon diversion member 30 whereupon it breaks into different directions as shown by arrows 41 and laterally directed toward wall closure 32. This action together with impingement against the inner side of wall closure 32 causes liquid to coalesce and drop directly downwardly as shown by arrows 42 through open end 34 of wall closure 32 for collection at the earth's surface as shown in FIG. 2 by reference numerals 17.

Gas rises through annulus 40 as shown by arrows 43 toward perforate closure means 37. While passing through means 37 any residual liquid particles still carried by the gas are removed as described hereinabove and that liquid falls back through annulus 40 to join liquid being removed downwardly as shown by arrows 42.

FIG. 8 shows diversion member 30 to be a round, essentially flat plate. However, diversion member 30 can be of any desired configuration such as square, triangular, or conical with the apex of the cone pointed upwardly or downwardly as desired or curved with the member being either convex or concave with respect to adapter 20.

Figure 9:
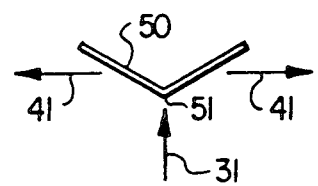
FIG. 9 shows one embodiment of a diversion member that can be employed in the flare vent head of this invention.

For example, FIG. 9 shows a diversion member 50 which is conical in shape with it apex 51 pointed downwardly toward adapter 20 so that gas-liquid mixture 31 is more deliberately directed into a lateral direction as shown by arrows 41 due to the inverted conical shape of diversion member 50.

Figure 10:
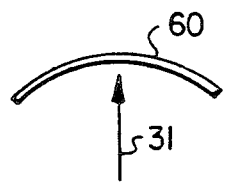
FIG. 10 shows yet another embodiment of a diversion member useful in the flare vent head of this invention.

FIG. 10 shows diversion member 60 which is curved in configuration, this particular curvature being convex with respect adapter 20.

Mist extractor cap 35 can be fixed to wall closure 32 in any desirable means such as by one or more set screws welding or the like, although a removable cap is preferred for sake of maintenance. However, cap 35 can simply be placed on top of wall closure 32 and left in place solely by gravity so that if an undue surge of gas from adapter 20 passes through cap 35 with extreme force and/or volume cap 35 will be blown off of head 14 as a safety precaution. Also, should the perforations in member 37 of cap 35 become plugged the cap will be blown off of head 14 with even normal gas pressure for safety purposes thereby preventing any flame present from being directed downwardly in its entirety and endangering riser 3 and/or support members 8 as described hereinabove with reference to the prior art devices shown in FIGS. 1 and 2.

EXAMPLE

A device substantially as shown in FIGS. 4 through 7 was fabricated and used on apparatus substantially as shown in FIG. 3. Pipeline 2 carried a conventional relief valve (not shown) and was connected to a commercial pipeline through which passed a mixture of natural gas and water. Vent riser 3 was a conventional 3 inch steel pipe externally threaded at its upper end. Adapter 20 was a 3 inch collar with internal threads which matched the threads on the upper end of vent riser 3 so that head 14 could be fixed to riser 3 simply by screwing adapter 20 onto the upper end of vent riser 3. Head 14 was approximately 12 inches high and 9 inches in diameter. Baffles 23 were approximately 2 inches wide and 6 inches high and welded to adapter 20 so that approximately 2¼ inches of each baffle 23 extended above upper open end 21 of adapter 20. Diversion member 30 was a 6 inch diameter round solid steel disk welded to upper edges 24 of baffle means 23. Well closure 32 extended approximately 6 inches above diversion member 30 before terminating at open end 33. Cap 35 was formed of three layers of metal mesh to form a perforate top member 37 to which was welded a 2 inch steel ring to serve as flange 36. Flange 36 fit over and engaged only by frictional means the outer surface of wall closure 32. This device was then operated in the apparatus of FIG. 3 and in the manner of FIG. 8. The natural gas emanating upwardly through cap 35 was ignited and a primary flame observed as shown for flame 15 in FIG. 3. A smaller secondary downwardly extending flame 16 was also observed from time to time, but this flame was sufficiently small that it was of no risk to riser 3 and did not come close to the earth's surface 1 so that it was of no risk whatsoever so support members 8 or vegetation at the earth's surface in the vicinity of riser 3 and within berm 18.

Reasonable variations and modifications are possible within the close of this disclosure without departing from the spirit and scope of this invention.

We claim:

1. In a flare vent head adapted for use on a vent riser to vent to the atmosphere a gas-liquid mixture passing through said riser to an upper end thereof, the improvement comprising a hollow adapter means having open upper and lower ends and means for fixing said vent head to said upper end of said riser so that said gas-liquid mixture passes from said riser into and through said adapter and exits from said open upper end of said adapter means, a plurality of upstanding spaced apart baffle means carried by and around the periphery of said adapter means, said baffle means having upper and lower ends and extending laterally away from said adapter means and each baffle means ending in an outer edge, said baffle means also extending from near the lower end of said adapter means to a common level above the upper end of said adapter means, a solid diversion member fixed at the upper ends of said baffle means and extending over said open upper end of said adapter means so that said gas-liquid mixture that exits from said upper open end of said adapter means impinges on said diversion member and is redirected at least in part laterally away from said adapter means, said baffle means extending laterally beyond the outer edge of said diversion member a wall closure means having an open top and bottom and encompassing said baffle means and adapter means, said wall closure means being fixed to said outer edges of said baffle means to provide a space between the outer edge of said diversion member and said wall closure means for the passage of gas therethrough, said wall closure means extending from near the lower end of said adapter means to a height substantially above said diversion member, a mist extractor cap carried over said open top of said wall closure means, said cap being perforate so as to allow most if not all gas to pass therethrough that emanates from said adapter means but with sufficient spaced apart solid members to knock a substantial amount of any liquid particles being carried by said gas downwardly toward said open bottom end of said wall closure means.

2. The apparatus according to claim 1 wherein said cap is held on said wall closure by gravity so that it will be blown off same in case of a substantial gas flow through said flare vent head.

3. The apparatus according to claim 1 wherein said diversion member is essentially flat.

4. The apparatus according to claim 1 wherein said diversion member is conical and has an apex.

5. The apparatus according to claim 4 said conical diversion member has its apex pointed downwardly toward said adapter means.

6. The apparatus according to claim 1 wherein said diversion member is curved.

7. The apparatus according to claim 6 wherein said curved diversion member is curved downwardly toward said adapter means.

* * * * *